J. M. SIMPSON.

Sash-Balances.

No. 136,461. Patented March 4, 1873.

Witnesses.
A. Ruppert.
C. S. Chesney

Inventor.
Josiah M. Simpson,
By Theodore Mungen,
Attorney.

UNITED STATES PATENT OFFICE.

JOSIAH M. SIMPSON, OF OSHKOSH, WISCONSIN.

IMPROVEMENT IN SASH-BALANCES.

Specification forming part of Letters Patent No. 136,461, dated March 4, 1873.

*To all whom it may concern:*

Be it known that I, JOSIAH M. SIMPSON, of Oshkosh, in the county of Winnebago and State of Wisconsin, have invented a new and useful improvement in devices for holding and balancing window-sashes, which I denominate the Novelty Sash-Balance; and I hereby declare the following to be a full, clear, and exact description of the same, reference being had to the accompanying drawing making part of this specification, in which—

Figure 1:
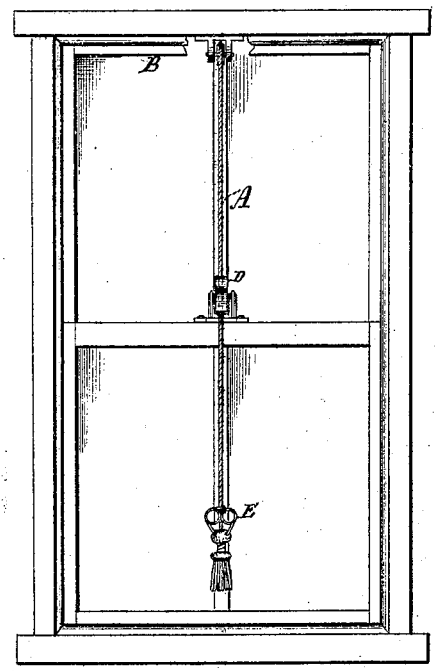
Figure 2:
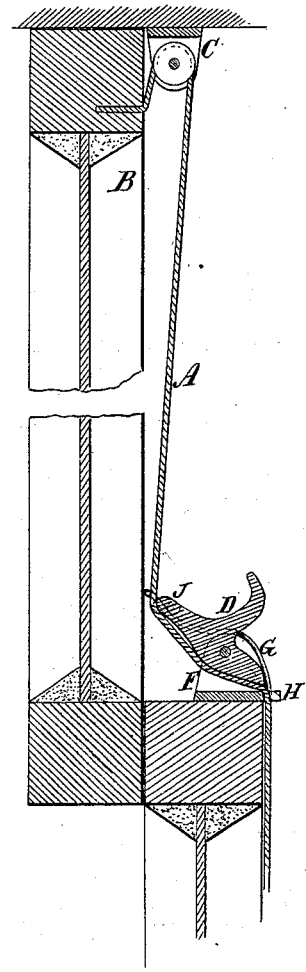
Figure 3:
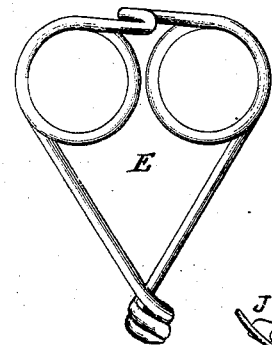
Figure 4:
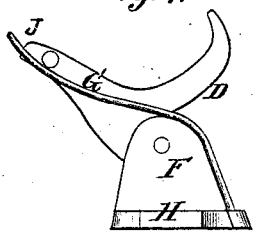
Figure 5:
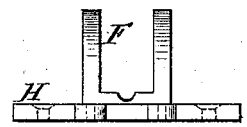

Figure 1 is a window frame and sashes with my improvement attached. Fig. 2 is a section of the sashes with the fixtures attached. Fig. 3 is a view in perspective of a finger-piece for operating the cord. Fig. 4 is a view of the spring-clamp, and Fig. 5 is a view of a portion of the same.

This invention relates to an improvement in devices for holding and balancing window-sashes; and consists of a spring-clamp composed of a dog journaled in bearings rising upright from a base, held by a spring which curves round the heel, passes on each side of the dog, runs down the front edges of the uprights, and terminates in the base, where it is secured; the object of the invention being to clamp or release, at the will of the operator, a cord properly attached to a window-sash, and the spring-clamp for the purposes of raising, lowering, and balancing the sashes.

In the accompanying drawing, the dog D is supported between the upright bearings F, which rise from the base H. The spring G is curved around the heel of the dog D so as to leave a small space, J, sufficiently large for the cord A to pass through between the heel of the dog D and the inside of the curve in the spring G. The spring G passes on each side of the dog D, runs down the front edges of the uprights F, and terminates in the base H, where its ends are secured. Projections near J, one on each side of the dog, prevent the spring G from slipping over it. A small groove is made between the nose of the dog D and that part of the base upon which it rests, through which the cord A passes, thereby preventing its being so rapidly worn out as it would otherwise be. A pulley, C, depends from the upper casing of the window. The cord A, secured to the upper sash at B, passes over the pulley C and down through the spring-clamp D F G H, which is secured to the top of the lower sash, and continues to the bottom of the window, where it terminates in a finger-piece and tassel, E. The force of the spring G is exerted upwardly at the projection near J, thus causing the nose of the dog D to be depressed, and to bite upon and hold the cord A inserted between the nose of the dog and the base H.

By grasping the finger-piece E and drawing the free end of the cord A outwardly and upwardly, the dog D will be slightly raised, and the lower sash will slide up the cord. As soon as the force exerted to raise the dog has been discontinued the cord will be again clamped and the sash held at the height to which it has been raised. If the lower sash be now still further raised without releasing the bite of the dog upon the cord the upper sash will be lowered accordingly. This is equally true when both sashes are closed; the sashes and cord being as shown in Fig. 1, raising the lower sash will cause the upper sash to descend.

It will be readily seen that, by the use of the devices herein described and shown, the sashes can be placed in any required position.

Having thus described my improvements, what I claim as new and useful, and desire to secure by Letters Patent, is—

The spring-clamp composed of the dog D journaled in bearings F F, and held and operated by the spring G, which curves around the heel of the dog D, and terminates in the base H, substantially as and for the purposes hereinbefore set forth.

JOSIAH M. SIMPSON.

Witnesses:
   E. C. BURGESS,
   JAS. E. PUGH.